United States Patent
Tang

(10) Patent No.: US 11,176,352 B2
(45) Date of Patent: *Nov. 16, 2021

(54) METHOD AND APPARATUS FOR PROCESSING AND GENERATING OFFLINE GRAPHIC CODE

(71) Applicant: ADVANCED NEW TECHNOLOGIES CO., LTD., Grand Cayman (KY)

(72) Inventor: Zhihui Tang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/170,014

(22) Filed: Feb. 8, 2021

(65) Prior Publication Data

US 2021/0165995 A1    Jun. 3, 2021

Related U.S. Application Data

(63) Continuation of application No. 16/888,410, filed on May 29, 2020, now Pat. No. 10,943,087, which is a
(Continued)

(30) Foreign Application Priority Data

Jun. 3, 2019    (CN) .......................... 201910478641.0

(51) Int. Cl.
*H04L 29/06* (2006.01)
*G06K 9/00* (2006.01)
(Continued)

(52) U.S. Cl.
CPC ....... *G06K 9/00154* (2013.01); *G06K 7/1417* (2013.01); *G06Q 20/4014* (2013.01); *H04L 9/0618* (2013.01); *H04L 63/08* (2013.01)

(58) Field of Classification Search
CPC .... H04N 2201/3233; H04N 2201/3235; H04L 63/08; H04L 9/0618; G06Q 20/4014; G06Q 7/1417; G06Q 9/00154; G06K 7/1417

See application file for complete search history.

(56) References Cited

U.S. PATENT DOCUMENTS

| 5,640,002 A | 6/1997 | Ruppert et al. |
| 7,028,902 B2 | 4/2006 | Xu et al. |

(Continued)

FOREIGN PATENT DOCUMENTS

| CN | 104050567 A | 9/2014 |
| CN | 107016420 A | 8/2017 |

(Continued)

OTHER PUBLICATIONS

First Search dated May 8, 2020, issued in related Chinese Application No. 201910478641.0 (1 page).

(Continued)

*Primary Examiner* — Hosuk Song

(57) ABSTRACT

A method includes: obtaining an image of a graphic code from a scanning device that scans the graphic code displayed on a user terminal of a user; extracting, from the image of the graphic code, graphic code information encoded in the graphic code; verifying signature information in the graphic code information, wherein the graphic code information comprises the signature information, at least one piece of identity information of the user, and service permission information of multiple services; determining whether the at least one piece of identity information of the user matches identity information accepted by a service provider corresponding to the scanning device; determining whether the service permission information of multiple services of the graphic code information matches service permission infor-
(Continued)

mation of a service supported by the scanning device; and executing the service.

20 Claims, 8 Drawing Sheets

Related U.S. Application Data continuation of application No. PCT/CN2020/071283, filed on Jan. 10, 2020.

(51) Int. Cl.
*G06K 7/14* (2006.01)
*G06Q 20/40* (2012.01)
*H04L 9/06* (2006.01)

(56) References Cited

U.S. PATENT DOCUMENTS

| | | | |
|---|---|---|---|
| 7,140,541 B2* | 11/2006 | Stelzer | G06Q 20/209 235/383 |
| 7,168,614 B2 | 1/2007 | Kotovich et al. | |
| 8,528,820 B2 | 9/2013 | Trajkovic et al. | |
| 8,595,503 B2 | 11/2013 | Ming | |
| 9,002,944 B2 | 4/2015 | Lewis et al. | |
| 9,083,531 B2* | 7/2015 | Chenna | H04L 9/3263 |
| 9,594,993 B2* | 3/2017 | Picard | G06K 7/1434 |
| 9,628,476 B2* | 4/2017 | Potash | H04L 63/0853 |
| 10,943,087 B2* | 3/2021 | Tang | H04L 63/08 |
| 10,949,636 B2* | 3/2021 | Govindaraj | G06F 9/543 |
| 2011/0258058 A1 | 10/2011 | Carroll et al. | |
| 2012/0160912 A1 | 6/2012 | Laracey | |
| 2013/0124855 A1 | 5/2013 | Varadarajan et al. | |
| 2014/0019358 A1 | 1/2014 | Priebatsch | |
| 2014/0279469 A1 | 9/2014 | Mendes | |
| 2016/0314462 A1 | 10/2016 | Hong et al. | |
| 2017/0068953 A1 | 3/2017 | Kim et al. | |
| 2017/0149757 A1 | 5/2017 | Rutherford et al. | |
| 2017/0161729 A1 | 6/2017 | Wang | |
| 2017/0249660 A1 | 8/2017 | Smith et al. | |
| 2017/0257358 A1 | 9/2017 | Ebrahimi et al. | |
| 2017/0262823 A1 | 9/2017 | Hartung | |
| 2018/0041339 A1 | 2/2018 | Lee | |
| 2018/0288033 A1 | 10/2018 | Kamal | |
| 2019/0180067 A1 | 6/2019 | Sun et al. | |
| 2020/0202093 A1 | 6/2020 | Chen et al. | |

FOREIGN PATENT DOCUMENTS

| | | |
|---|---|---|
| CN | 108154211 A | 6/2018 |
| CN | 108737394 A | 11/2018 |
| CN | 108900302 A | 11/2018 |
| CN | 109523254 A | 3/2019 |
| CN | 110335036 A | 10/2019 |

OTHER PUBLICATIONS

First Office Action dated May 15, 2020, issued in related Chinese Application No. 201910478641.0, with English machine translation (40 pages).
Second Office Action dated Jun. 23, 2020, issued in related Chinese Application No. 201910478641.0, with English machine translation (39 pages).
Third Office Action dated Jul. 29, 2020, issued in related Chinese Application No. 201910478641.0, with English machine translation (32 pages).
International Search Report and Written Opinion for PCT Application No. PCT/CN2020/071283, dated Dec. 10, 2020, with partial English translation (11 pages).

* cited by examiner

METHOD AND APPARATUS FOR PROCESSING AND GENERATING OFFLINE GRAPHIC CODE

CROSS REFERENCE TO RELATED APPLICATIONS

This application is a continuation of U.S. patent application Ser. No. 16/888,410, filed May 29, 2020, which is a continuation application of International Application No. PCT/CN2020/071283, filed on Jan. 10, 2020, which claims priority to and benefits of Chinese Patent Application No. 201910478641.0 filed on Jun. 3, 2019. The contents of the above-referenced applications are incorporated herein by reference in their entirety.

TECHNICAL FIELD

The specification relates to the field of graphic code technologies, and in particular, to a method and an apparatus for processing and generating an offline graphic code.

BACKGROUND

With the rapid development of information technologies and the popularization of graphic code technologies, graphic codes such as quick response codes and bar codes have been widely applied to various fields, such as the payment field, the access control field, and the like. To make it convenient for users to use the graphic codes and reduce users' waiting time during a graphic code verification process, offline graphic codes have been widely applied to various fields currently, where a graphic code is generated offline by a graphic code display device and verified offline by a scanning device. For example, the offline graphic codes are applied to consumer scenarios such as code scanning at subway stations, campus cafeterias, convenience stores, and bathhouses for transactions.

While the users are using the offline graphic codes in various application scenarios, how to further improve convenience for users to use the offline graphic codes has currently become a technical problem to be urgently resolved.

SUMMARY

Embodiments of the specification are directed to provide a method and an apparatus for processing and generating an offline graphic code. At least one piece of identity information of a user and service permission information of multiple services are added to a generated offline graphic code. That is, the user can perform multiple service operations by using the offline graphic code. In this way, when the user needs to use the offline graphic code in different scenarios, the user only needs to show up the same offline graphic code for verification. A scanning device checks/determines whether identity information accepted by a service provider of the scanning device is included in the offline graphic code, and whether service permission information of a service supported by the scanning device is included in the offline graphic code. Further, based on a check result, the scanning device determines whether the user has a permission to perform a service corresponding to the scanning device. In this way, multiple service permissions are assigned to one offline graphic code, thereby avoiding the trouble of showing up different offline graphic codes to perform different services using the offline graphic code in different scenarios, increasing the utilization ratio of the offline graphic code, and bringing great convenience to the user.

To resolve the above technical problems, the embodiments of the specification are implemented in the following ways.

An embodiment of the specification provides a method for processing an offline graphic code, applied to a scanning device and including: verifying signature information in graphic code information obtained by scanning an offline graphic code of a user, where the graphic code information includes the signature information, at least one piece of identity information of the user, and service permission information of multiple services; determining, if the signature information is verified successfully, whether identity information accepted by a service provider corresponding to the scanning device is included in the graphic code information, and whether service permission information of a service supported by the scanning device is included in the graphic code information; and determining that the user has a permission to obtain the service corresponding to the scanning device if the identity information accepted by the service provider corresponding to the scanning device and the service permission information of the service supported by the scanning device exist.

An embodiment of the specification further provides a method for generating an offline graphic code, including: obtaining at least one piece of identity information of a user, and obtaining service permission information of multiple services; and generating a value corresponding to an offline graphic code based on the at least one piece of identity information and the service permission information of the multiple services.

An embodiment of the specification further provides an apparatus for processing an offline graphic code, applied to a scanning device and including: a verification module, configured to verify signature information in graphic code information obtained by scanning an offline graphic code of a user, where the graphic code information includes the signature information, at least one piece of identity information of the user, and service permission information of multiple services; a check module, configured to check/determine, if the signature information is verified successfully, whether identity information accepted by a service provider corresponding to the scanning device is included in the graphic code information, and whether service permission information of a service supported by the scanning device is included in the graphic code information; and a determining module, configured to determine that the user has a permission to obtain the service corresponding to the scanning device if the identity information accepted by the service provider corresponding to the scanning device and the service permission information of the service supported by the scanning device exist.

An embodiment of the specification further provides an apparatus for generating an offline graphic code, including: an obtaining module, configured to obtain at least one piece of identity information of a user, and obtain service permission information of multiple services; and a generating module, configured to generate a value corresponding to an offline graphic code based on the at least one piece of identity information and the service permission information of the multiple services.

An embodiment of the specification further provides a device for processing an offline graphic code, applied to a scanning device and including: a processor and a memory arranged to store a computer-executable instruction that, when executed, causes the processor to: verify signature information in graphic code information obtained by scanning an offline graphic code of a user, where the graphic code information includes the signature information, at least one piece of identity information of the user, and service permission information of multiple services; determine, if the signature information is verified successfully, whether identity information accepted by a service provider corresponding to the scanning device is included in the graphic code information, and whether service permission information of a service supported by the scanning device is included in the graphic code information; and determine that the user has a permission to obtain the service corresponding to the scanning device if the identity information accepted by the service provider corresponding to the scanning device and the service permission information of the service supported by the scanning device exist.

An embodiment of the specification further provides a device for generating an offline graphic code, including: a processor and a memory arranged to store a computer-executable instruction that, when executed, causes the processor to: obtain at least one piece of identity information of a user, and obtain service permission information of multiple services; and generate a value corresponding to an offline graphic code based on the at least one piece of identity information and the service permission information of the multiple services.

An embodiment of the specification further provides a storage medium, configured to store a computer-executable instruction that, when executed, implements the following processes: verifying signature information in graphic code information obtained by scanning an offline graphic code of a user, where the graphic code information includes the signature information, at least one piece of identity information of the user, and service permission information of multiple services; determining, if the signature information is verified successfully, whether identity information accepted by a service provider corresponding to a scanning device is included in the graphic code information, and whether service permission information of a service supported by the scanning device is included in the graphic code information; and determining that the user has a permission to obtain the service corresponding to the scanning device if the identity information accepted by the service provider corresponding to the scanning device and the service permission information of the service supported by the scanning device exist.

An embodiment of the specification further provides a storage medium, configured to store a computer-executable instruction that, when executed, implements the following processes: obtaining at least one piece of identity information of a user, and obtaining service permission information of multiple services; and generating a value corresponding to an offline graphic code based on the at least one piece of identity information and the service permission information of the multiple services.

An embodiment of the specification further provides a method for processing a graphic code. The method includes: scanning, by a scanning device, a graphic code displayed on a user terminal of a user to obtain an image of the graphic code; extracting, from the image of the graphic code by a processor coupled to the scanning device, graphic code information encoded in the graphic code; verifying, by the processor, signature information in the graphic code information, wherein the graphic code information comprises the signature information, at least one piece of identity information of the user, and service permission information of multiple services; in response to that the signature information is successfully verified, determining, by the processor, whether the at least one piece of identity information of the user matches identity information accepted by a service provider corresponding to the scanning device; in response to determining that the at least one piece of identity information of the user matches the identity information accepted by the service provider corresponding to the scanning device, determining, by the processor, whether the service permission information of multiple services of the graphic code information matches service permission information of a service supported by the scanning device; and in response to determining that the service permission information of multiple services of the graphic code information matches the service permission information of the service supported by the scanning device, executing, by the processor, the service.

In some implementations, the determining, by the processor, whether the at least one piece of identity information of the user matches identity information accepted by a service provider corresponding to the scanning device includes: extracting, by the processor, the at least one piece of identity information of the user from the graphic code information; and comparing, by the processor, the at least one piece of identity information of the user with the identity information accepted by the service provider corresponding to the scanning device; and when the at least one piece of identity information of the user includes the identity information accepted by the service provider, determining, by the processor, that the at least one piece of identity information of the user matches identity information accepted by the service provider corresponding to the scanning device.

In some implementations, the extracting, by the processor, the at least one piece of identity information of the user from the graphic code information includes: extracting, by the processor, an identity information field from the graphic code information; and extracting, by the processor, a plurality of identity information subfields from the identity information field, wherein one of the identity information subfields corresponds to the at least one piece of identity information of the user.

In some implementations, the determining, by the processor, whether the service permission information of multiple services of the graphic code information matches service permission information of a service supported by the scanning device includes: extracting, by the processor, the service permission information of the multiple services from the graphic code information; and comparing, by the processor, the service permission information of the multiple services with the service permission information of the service supported by the scanning device; and when the service permission information of the multiple services includes the service permission information of the service supported by the scanning device, determining, by the processor, that the service permission information of multiple services of the graphic code information matches service permission information of a service supported by the scanning device.

In some implementations, the extracting, by the processor, the service permission information of the multiple services from the graphic code information includes: extracting, by the processor, a service permission information field from the graphic code information; and extracting, by the processor, a plurality of permission information subfields from the service permission information field, wherein one of the permission information subfields corresponds to service permission information of the service.

In some implementations, before determining, by the processor, whether the at least one piece of identity information of the user matches identity information accepted by the service provider corresponding to the scanning device, the method further includes: determining, by the processor, whether the extracted at least one piece of identity information includes encrypted identity ciphertext information; and in response to determining that the extracted at least one piece of identity information includes encrypted identity ciphertext information, decrypting, by the processor, the identity ciphertext information to obtain decrypted identity information of the user.

In some implementations, the service permission information of the service includes at least at least one of: the service supported by the scanning device, and service provider information corresponding to the service. The at least one piece of identity information of the user comprises at least one of: a name and identification information of the user, and location information of the user.

An embodiment of the specification further provides an apparatus. The apparatus includes one or more processors and a memory storing instructions executable by the one or more processors to cause the one or more processors to perform operations including: obtaining an image of a graphic code from a scanning device that scans the graphic code displayed on a user terminal of a user; extracting, from the image of the graphic code, graphic code information encoded in the graphic code; verifying signature information in the graphic code information, wherein the graphic code information comprises the signature information, at least one piece of identity information of the user, and service permission information of multiple services; in response to that the signature information is successfully verified, determining whether the at least one piece of identity information of the user matches identity information accepted by a service provider corresponding to the scanning device; in response to determining that the at least one piece of identity information of the user matches the identity information accepted by the service provider corresponding to the scanning device, determining whether the service permission information of multiple services of the graphic code information matches service permission information of a service supported by the scanning device; and in response to determining that the service permission information of multiple services of the graphic code information matches the service permission information of the service supported by the scanning device, executing the service.

An embodiment of the specification further provides one or more non-transitory computer-readable storage media configured with instructions executable by one or more processors to cause the one or more processors to perform operations including: obtaining an image of a graphic code from a scanning device that scans the graphic code displayed on a user terminal of a user; extracting, from the image of the graphic code, graphic code information encoded in the graphic code; verifying signature information in the graphic code information, wherein the graphic code information comprises the signature information, at least one piece of identity information of the user, and service permission information of multiple services; in response to that the signature information is successfully verified, determining whether the at least one piece of identity information of the user matches identity information accepted by a service provider corresponding to the scanning device, determining whether the service permission information of multiple services of the graphic code information matches service permission information of a service supported by the scanning device; and in response to determining that the service permission information of multiple services of the graphic code information matches the service permission information of the service supported by the scanning device, executing the service.

In the technical solutions provided in the embodiments hereof, at least one piece of identity information of a user and service permission information of multiple services are added to a generated offline graphic code. That is, the user can perform multiple service operations by using the offline graphic code. In this way, when the user needs to use the offline graphic code in different scenarios, the user only needs to show up the same offline graphic code for verification. A scanning device checks/determines whether identity information accepted by a service provider of the scanning device is included in the offline graphic code, and whether service permission information of a service supported by the scanning device is included in the offline graphic code. Further, based on a check result, the scanning device determines whether the user has a permission to perform a service corresponding to the scanning device. In this way, multiple service permissions are assigned to one offline graphic code, thereby avoiding the trouble of showing up different offline graphic codes to perform different services using the offline graphic code in different scenarios, increasing the utilization ratio of the offline graphic code, and bringing great convenience to the user.

BRIEF DESCRIPTION OF THE DRAWINGS

To describe the technical solutions in the embodiments in this specification or in the existing technologies more clearly, the following briefly introduces the accompanying drawings required for describing the embodiments or the existing technologies. Apparently, the accompanying drawings in the following description show merely some embodiments in the specification, and a person of ordinary skill in the art may still derive other drawings from these accompanying drawings without creative efforts.

DETAILED DESCRIPTION OF EMBODIMENTS

To enable a person skilled in the art to better understand the technical solutions in the specification, the technical solutions of the embodiments of the specification will be described clearly and thoroughly below with reference to the accompanying drawings of the embodiments of the specification. Apparently, the described embodiments are merely some rather than all of the embodiments of the specification. All other embodiments obtained by a person of ordinary skill in the art based on the embodiments of the specification without creative efforts shall fall within the protection scope of the specification.

The idea of the embodiments of the specification is that at least one piece of identity information of a user and service permission information of multiple services are added to the same offline graphic code. In this way, when the user performs different services using the offline graphic code in multiple different scenarios, the user can use the same offline graphic code, thereby avoiding the trouble of showing up different offline graphic codes in different scenarios, improving the utilization ratio of the offline graphic code, and bringing great convenience to the user. Based on this, the embodiments of the specification provide a method, an apparatus, and a device for processing and generating an offline graphic code, and a storage medium, as described in detail below.

First, an embodiment of the specification provides a method for processing an offline graphic code. The method is applied to a scanning device. That is, the method is performed by a scanning device, and specifically, by an apparatus for processing an offline graphic code that is installed on the scanning device.

The offline graphic code mentioned in the embodiments of the specification generally refers to a graphic code generated by a graphic code generating device (such as a graphic code display device) in an offline environment and intended for being scanned and verified by a scanning device in an offline environment.

The offline graphic code mentioned in the embodiments of the specification may be an offline quick response code or an offline bar code, or the like. The commonly seen form of the offline quick response code is a square quick response code, a circular quick response code, or the like. In addition, the offline graphic code may also be another code for displaying and scanning, and is not enumerated herein exhaustively.

Figure 1:
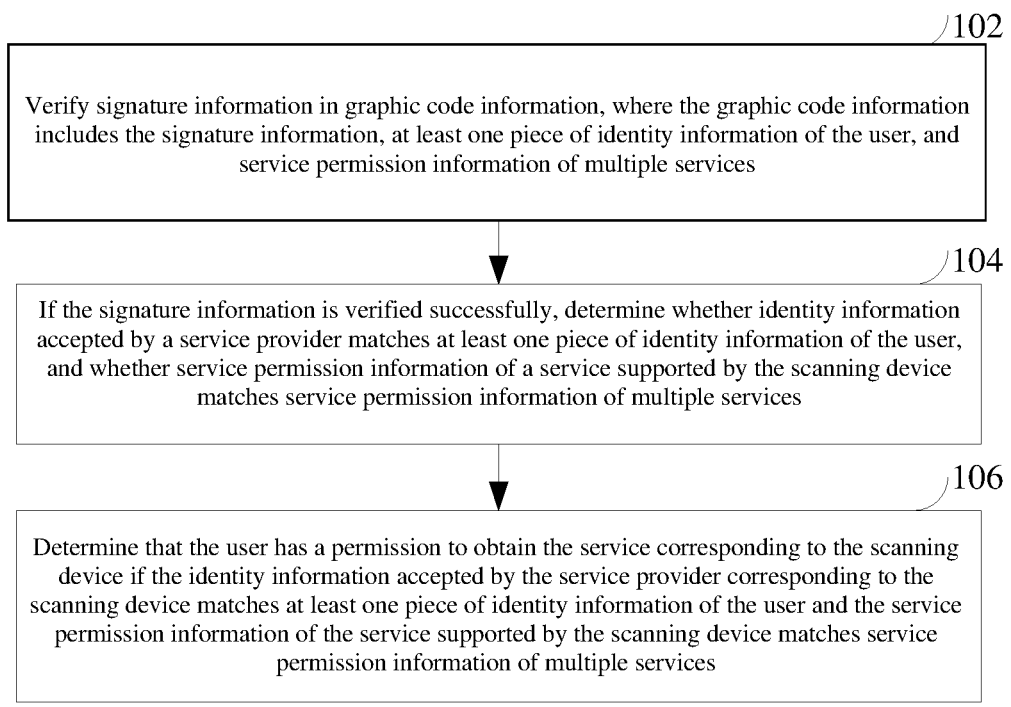
FIG. 1 is a flowchart of a method for processing an offline graphic code, according to an embodiment of the specification.

FIG. 1 is a first method flowchart of a method for processing an offline graphic code, according to an embodiment of the specification. The method shown in FIG. 1 includes at least the following steps.

Step 102: Verify signature information in graphic code information obtained by scanning an offline graphic code of a user, where the graphic code information includes the signature information, at least one piece of identity information of the user, and service permission information of multiple services.

In a specific implementation, the user uses a graphic code display device/user terminal (such as a mobile phone or a tablet) to show up an offline graphic code to be used currently, and places the offline graphic code in an scanning window region of the scanning device, for the scanning device to scan the offline graphic code to obtain graphic code information corresponding to the offline graphic code. For example, the scanning device takes an image of the graphic code displayed on the user terminal of the user.

The graphic code information encoded in the graphic code may be extracted from the image of the graphic code by a processor coupled to the scanning device. The above graphic code information may be information obtained by parsing the scanned offline graphic code, may include signature information, at least one piece of identity information of the user, service permission information of multiple services, and the like, and may further include scanning time information and the like.

In the embodiment of the specification, at least one piece of identity information of the same user is set in one offline graphic code. The identity information may be the identity information of the user in different scenarios. For example, the same user may be a student in school, an employee in a company, or even a resident in a community. For this user, student identity information, employee identity information, and community resident information of the user may be all added to the offline graphic code.

Similarly, the same offline graphic code may be used for dining in a school cafeteria, entering a library, entering a community, checking in at a company, and the like. Therefore, a school cafeteria service permission, a library access permission, a community access permission, a company check-in and check-out permission, and the like, may be added to the offline graphic code.

Notwithstanding, the foregoing is only an exemplary description. In specific applications, the identity information of the user and the service permission information of authorized services may be set in the offline graphic code according to actual application scenarios.

In the embodiment of the specification, one piece of identity information of the user and the service permission information of multiple services may be added to the offline graphic code, or multiple pieces of identity information of the user and the service permission information of multiple services may be added to the offline graphic code.

In the embodiment of the specification, in step 102 above, the verifying signature information in graphic code information includes: verifying an issuer, verifying user information, verifying a validity period of the offline graphic code, and the like. Through the above verifications, the offline graphic code can be verified elementarily to preclude invalid graphic codes that cannot generate a graphic code value due to expiration or mismatch of the issuer related to the scanning device.

In a specific implementation, after the offline graphic code is scanned, the scanned offline graphic code is parsed to obtain a value corresponding to the offline graphic code. The value of the offline graphic code is decrypted by using a public key of the issuer of the offline graphic code, where the public key is prestored in the scanning device. If the decryption succeeds, it is determined that the issuer of the offline graphic code is verified successfully. Then based on generation time information that is obtained after the decryption and that is of the offline graphic code and based on the scanning time information, whether the offline graphic code is currently within the validity period is checked/determined. If the offline graphic code is currently within the validity period, it is determined that the validity period information of the offline graphic code is verified successfully. After the value of the offline graphic code is decrypted using the public key, all the identity information of the user stored in the offline graphic code is obtained, and the identity information is verified. After the verification succeeds, it is deemed that the signature information of the offline graphic code is verified successfully.

Step 104: If the signature information is verified successfully, determine whether identity information accepted by a service provider corresponding to a scanning device matches at least one piece of identity information of the user in the graphic code information, and whether service permission information of a service supported by the scanning device matches service permission information of multiple services of the graphic code information.

The service provider is a party who provides the service corresponding to the scanning device. For example, if the scanning device is applied to community access control, the service provider corresponding to the scanning device may be a community property management company; if the scanning device is applied to a school cafeteria, the service provider corresponding to the scanning device may be a school logistics service provider, and so on.

When the user needs a service using the offline graphic code and through the scanning device, after the signature information of the offline graphic code is verified successfully, the scanning device, through its processor, determines whether the identity information accepted by the service provider corresponding to the scanning device in included in the graphic code information corresponding to the offline graphic code, and whether the service permission information of the service supported by the scanning device in included in the graphic code information.

For example, in a specific implementation, the scanning device is applied to an access control system of an XX Community. After the scanning device successfully verifies the signature information in the graphic code information obtained by scanning the offline graphic code of the user, the scanning device determines whether any identity information of a resident of the XX Community (the identity information accepted by the property management company corresponding to the scanning device) in included in the graphic code information, and whether service permission information of accessing the XX Community in included in the graphic code information.

Step 106: Determine that the user has a permission to obtain the service corresponding to the scanning device if the identity information accepted by the service provider corresponding to the scanning device matches at least one piece of identity information of the user and the service permission information of the service supported by the scanning device matches service permission information of multiple services, and execute the service for the user.

In the method for processing an offline graphic code according to the embodiment of the specification, at least one piece of identity information of a user and service permission information of multiple services are added to a generated offline graphic code. That is, the user can perform multiple service operations using the offline graphic code. In this way, when the user needs to use the offline graphic code in different scenarios, the user only needs to show up the same offline graphic code for verification, thereby assigning multiple service permissions to one offline graphic code, avoiding the trouble of showing up different offline graphic codes to perform different services by using the offline graphic code in different scenarios, increasing the utilization ratio of the offline graphic code, and bringing great convenience to the user.

In a specific implementation, in step 104 above, the determining whether identity information accepted by a service provider corresponding to the scanning device matches the at least one piece of identity information of the user in the graphic code information specifically includes the following steps 1 and 2:

Step 1: Extract the identity information of the user from the graphic code information; and Step 2: Determine whether the identity information accepted by the service provider corresponding to the scanning device matches the at least one piece of identity information of the user by comparing the at least one piece of identity information of the user with the identity information accepted by the service provider corresponding to the scanning device. When the at least one piece of identity information of the user includes the identity information accepted by the service provider, it is determined that the at least one piece of identity information of the user matches identity information accepted by the service provider corresponding to the scanning device.

In step 104 above, the determining whether service permission information of a service supported by the scanning device is included in the graphic code information specifically includes the following steps (1) and (2):

Step (1): Extract the service permission information of the multiple services from the graphic code information; and Step (2): Determine whether the service permission information of the service supported by the scanning device is included in the extracted service permission information of the multiple services by comparing the service permission information of the multiple services with the service permission information of the service supported by the scanning device. When the service permission information of the multiple services includes the service permission information of the service supported by the scanning device, it is determined that the service permission information of multiple services of the graphic code information matches service permission information of a service supported by the scanning device In a specific implementation, all the identity information of the user may be extracted from the graphic code information, and then existence of any identity information accepted by the service provider corresponding to the scanning device is checked one by one. Alternatively, whenever a piece of identity information is extracted, the identity information is verified, until the identity information accepted by the service provider corresponding to the scanning device is extracted. In addition, for a detailed implementation process of the determining whether service permission information of a service supported by the scanning device is included in the graphic code information, reference may be made to the detailed process of determining the identity information, and the details are omitted herein.

Generally, the identity information and the service permission information of the service supported by the scanning device is stored in the scanning device. For example, the scanning device supports a payment operation performed by a student in the XX School, and the corresponding merchant information is XX, and so on. Therefore, in a specific implementation, after the identity information of the user is extracted from the graphic code information, the extracted identity information is searched for the identity information that matches the identity information stored in the scanning device. If the matched identity information is found, a further check is performed to determine whether the service permission information of the service supported by the scanning device is included in the extracted service permission information. If the service permission information of the supported service is included, it is deemed that the user has the permission to obtain the service corresponding to the scanning device.

For ease of understanding, the following gives a description using examples.

For example, in a specific implementation, Zhang San is both a student of a school and a resident of an apartment. The identity information of Zhang San set in the offline graphic code is as follows:

Identity 1: a student of XX School—student No.: 0001—Name: Zhang San—School ID: 1111; identity 2: a resident of XX Apartment—suite No.: 6265—Name: Zhang San—apartment name: Talent Apartment.

The service permission information of the service set in the offline graphic code is as follows:

Permission 1: payment—service provider ID: 2088111122223333; permission 2: authentication—service provider ID: 2088111122223333; permission 3: authentication—service provider ID: 2088222233335555.

When buying something in a school supermarket, Zhang San shows up the offline graphic code on a graphic code display device. The offline graphic code is scanned by a scanning device installed in the school supermarket. After scanning the offline graphic code, the scanning device parses the offline graphic code first to obtain a value corresponding to the offline graphic code. Based on the value, the scanning device verifies a signature on the offline graphic code. After the signature is verified successfully, each piece of identity information of the user is extracted from the value corresponding to the offline graphic code. Because the scanning device only supports shopping of students and faculty members of this school, it is necessary to find out whether the identity information of any student or faculty member of this school is included in each piece of identity information. Through searching, it is determined that the identity information includes such identity as the student of XX School. Therefore, the identity information accepted by the service provider corresponding to the scanning device is included in the extracted identity information. Then a variety of permission information corresponding to the offline graphic code is extracted from the value corresponding to the offline graphic code. Information about services supported by the scanning device and the corresponding service provider (in this example, the merchant) is stored in the scanning device. Through searching, it is found that the offline graphic code has been assigned a permission to make payments to the merchant 2088111122223333. Therefore, it is deemed that the user has the permission to perform a payment operation on the scanning device, and the corresponding payment operation is performed.

For another example, when Zhang San needs to swipe to enter the Talent Apartment where he/she lives, Zhang San uses a graphic code display device to show up the offline graphic code for authentication. A scanning device installed in the Talent Apartment scans the offline graphic code. After successfully scanning the offline graphic code, the scanning device parses the offline graphic code to obtain a value corresponding to the offline graphic code, and verifies the signature on the offline graphic code based on the value. After successfully verifying the signature, the scanning device extracts each piece of identity information of the user from the value corresponding to the offline graphic code, and searches each piece of extracted identity information for such identity information as a resident of the Talent Apartment. Through searching, it is found that Zhang San is a resident of Suite 6265 of Talent Apartment. Subsequently, the scanning device extracts the permission information corresponding to the offline graphic code from the value corresponding to the offline graphic code, and determines whether each piece of extracted permission information includes the permission to enter Talent Apartment. Through searching, it is found the offline graphic code has the permission to enter Talent Apartment. Therefore, it is deemed that Zhang San has the permission to enter Talent Apartment through the scanning device.

In a specific implementation, the extracting the identity information of the user from the graphic code information in step 1 above specifically includes:

extracting an identity information field from the graphic code information; and extracting an identity information subfield from the identity information field, where one identity information subfield corresponds to one piece of identity information of the user.

Generally, when the value corresponding to the offline graphic code is generated, information fields are set correspondingly, such as a user identity information field, a service permission information field, a random number field, and the like. Each field is generally set in a fixed position. For example, the user identity information field is in a position 1, the service permission information field is in a position 2, the random number field is in a position 3, and so on. Therefore, when at least one piece of identity information of the user is extracted, the position of the identity information field may be determined based on position information corresponding to each information field in a value generation rule, thereby extracting the user identity information field from the value.

At least one piece of identity information of the user is set in the offline graphic code, and one identity information subfield corresponds to one piece of identity information of the user. Therefore, each identity information subfield needs to be extracted separately at the time of extracting each piece of identity information.

For example, in a specific implementation, for a user A, two pieces of identity information of the user A are added to the offline graphic code. That is, the identity information field in the offline graphic code includes an identity information subfield 1 and an identity information subfield 2. The identity information subfield 1 corresponds to an identity 1 of the user A, and the identity information subfield 2 corresponds to an identity 2 of the user A. Therefore, a specific form of the identity information field is shown below:

Identity 1: student of XX School—student No.—name—school ID; identity 2: resident of XX Community—building No., unit, suite No.—name—community ID.

In a specific implementation, the identity information corresponding to each information subfield mentioned above is extracted separately as the identity information of the user.

Figure 2:
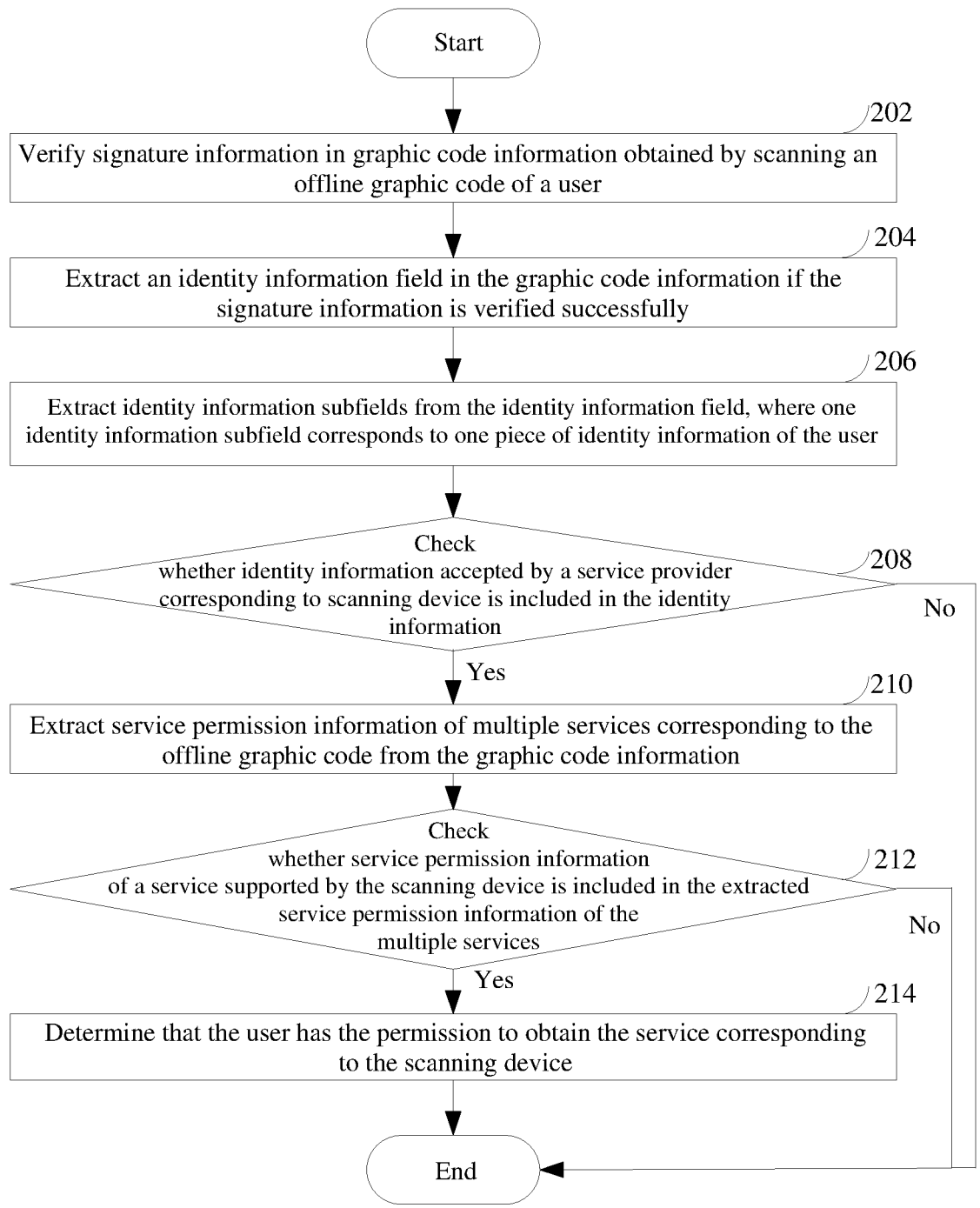
FIG. 2 is a flowchart of another method for processing an offline graphic code, according to an embodiment of the specification.

FIG. 2 is a second method flowchart of a method for processing an offline graphic code, according to an embodiment of the specification. The method shown in FIG. 2 includes at least the following steps:

Step 202: Verify signature information in graphic code information obtained by scanning an offline graphic code of a user;

Step 204: Extract an identity information field in the graphic code information if the signature information is verified successfully;

Step 206: Extract an identity information subfield from the identity information field, where one identity information subfield corresponds to one piece of identity information of the user;

Step 208: Determine whether identity information accepted by a service provider corresponding to a scanning device is included in the identity information. If such accepted identity information is included, perform step 210; otherwise, end the process;

Step 210: Extract service permission information of multiple services corresponding to the offline graphic code from the graphic code information;

Step 212: Determine whether service permission information of a service supported by the scanning device is included in the extracted service permission information of the multiple services. If the service permission information is included, perform step 214; otherwise, end the process; and Step 214: Determine that the user has the permission to obtain the service corresponding to the scanning device.

Notwithstanding, the embodiment corresponding to FIG. 2 is only one of the specific implementations. In a specific implementation, the identity information and the service permission information of the multiple services may be extracted and then checked; or, according to the embodiment shown in FIG. 2, the identity information is extracted and checked first, and the service permission information is extracted and checked after the identity information is checked successfully. Both implementations are appropriate and are not limited by the embodiments of the specification.

Specifically, in step (1) above, the extracting the service permission information of the multiple services from the graphic code information specifically includes: extracting a service permission information field from the graphic code information; and extracting multiple permission information subfields from the service permission information field, where one permission information subfield corresponds to service permission information of one service.

For example, in a specific implementation, for an offline graphic code, the user can use the offline graphic code to both dine in a school cafeteria and get authenticated to enter a student apartment. Therefore, a possible form of the permission information field is shown below:

Permission 1: payment—service provider ID: 2088111122223333; permission 2: authentication—service provider ID: 2088222233335555.

The service provider ID is used to identify a service provider with which the offline graphic code is permitted to obtain the service. For example, the service provider may be a merchant, a community property management company, an administration department, or the like.

In a specific implementation, the service permission information corresponding to each permission information subfield is extracted separately as the service permission information corresponding to the offline graphic code.

Figure 3:
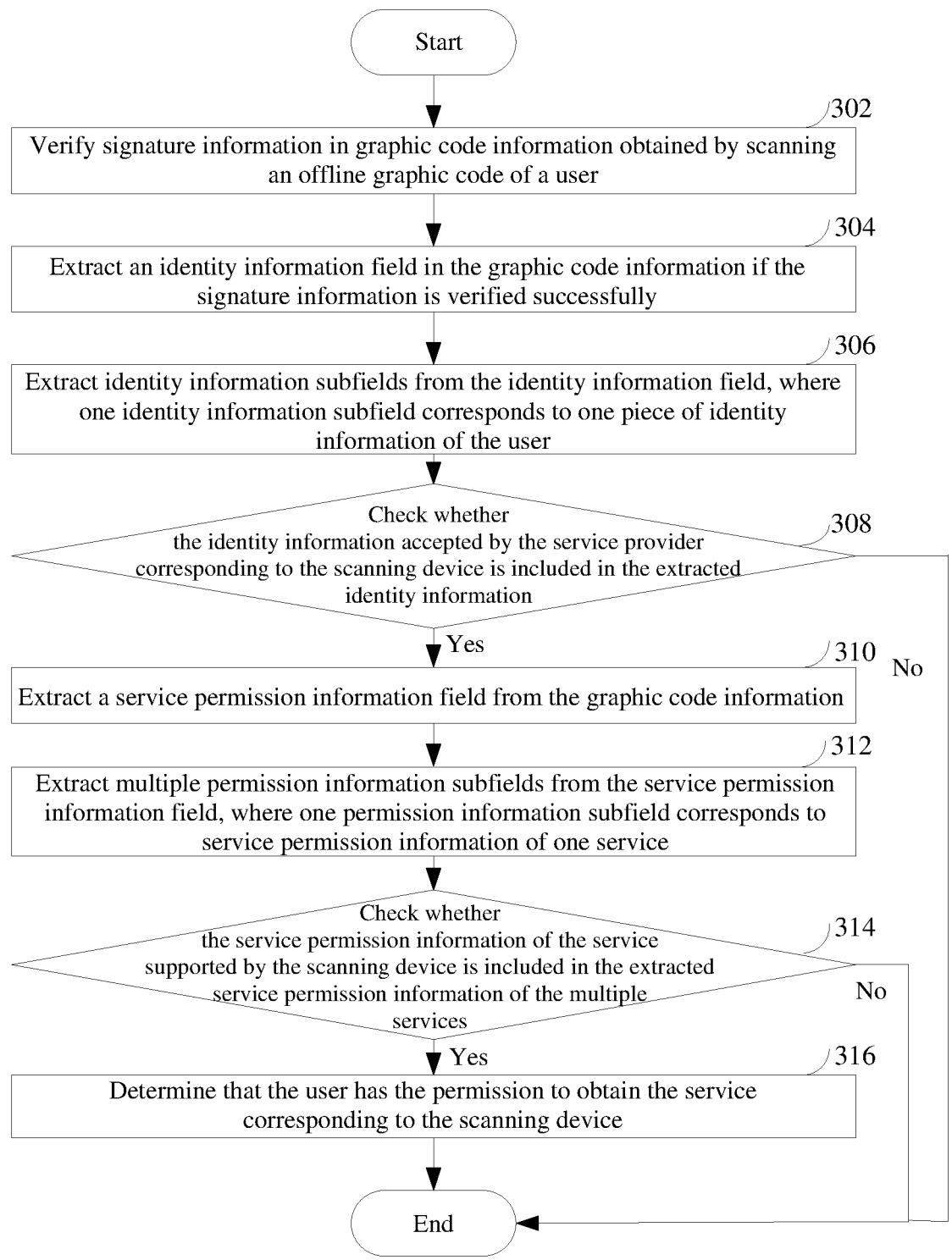
FIG. 3 is a flowchart of yet another method for processing an offline graphic code, according to an embodiment of the specification.

FIG. 3 is a third method flowchart of a method for processing an offline graphic code, according to an embodiment of the specification. The method shown in FIG. 3 includes at least the following steps:

Step 302: Verify signature information in graphic code information obtained by scanning an offline graphic code of a user;

Step 304: Extract an identity information field in the graphic code information if the signature information is verified successfully;

Step 306: Extract an identity information subfield from the identity information field, where one identity information subfield corresponds to one piece of identity information of the user;

Step 308: Determine whether identity information accepted by a service provider corresponding to a scanning device is included in the extracted identity information. If such accepted identity information is included, perform step 310; otherwise, end the process;

Step 310: Extract a service permission information field from the graphic code information;

Step 312: Extract multiple permission information subfields from the service permission information field, where one permission information subfield corresponds to service permission information of one service;

Step 314: Determine whether service permission information of a service supported by the scanning device is included in the extracted service permission information of multiple services. If the service permission information is included, perform step 316; otherwise, end the process; and Step 316: Determine that the user has the permission to obtain the service corresponding to the scanning device.

In a specific implementation, the identity information of the user and the service permission information may be extracted and then verified. Alternatively, the identity information of the user is extracted and verified first, and then the service permission information is extracted and verified. The embodiments of the specification do not limit the order of performing the above specific processes.

In the embodiment of the specification, an identity information field of the offline graphic code is divided into multiple identity information subfields. A piece of identity information of the user is added in each piece of identity information subfield. In this way, multiple pieces of identity information of the user can be added in the offline graphic code. In addition, a service permission information field is divided into multiple permission information subfields, and one permission information subfield corresponds to the service permission information of one service of the offline graphic code. In this way, multiple pieces of service permission information of the offline graphic code are added in the offline graphic code, thereby enabling the user to use the same offline graphic code to perform corresponding services in multiple scenarios, avoiding the trouble of showing up different offline graphic codes by different means in different scenarios, and facilitating user operations.

In a specific implementation, the service permission information of the service includes at least: the service supported by the scanning device, and service provider information corresponding to the service.

The identity information includes at least: a name and identification information of the user, and application scenario region information.

The service may be a payment service, an authentication service, or the like. If the service is a payment service, the service provider information may be merchant information corresponding to the payment service. If the service is an authentication service, the service provider information may be a work unit information corresponding to the authentication service, such as company information, community property management company information, or a library administration department.

For ease of understanding the service permission information of the services mentioned in the embodiment of the specification, the following gives a description using examples.

For example, in a specific implementation, the service permission information of the service may be: payment— service provider ID: 2088111122223333.

In the embodiment of the specification, multiple service providers may have the same service. For example, a company needs to set up access control to authenticate a person who attempts to enter the company, a library needs to set up access control to authenticate a person who attempts to enter the library, a community needs to set up access control to authenticate a person who attempts to enter the community. Therefore, to identify whether the service corresponding to the offline graphic code matches the service supported by the scanning device, a service provider ID corresponding to the service needs to be added in the service permission information.

In a specific application scenario, the identity information may include a name and identification information of the user, and application scenario region information. The application scenario region information may be a work unit or an activity site corresponding to the identity information, such as XX School, XX School Library, XX Company, or XX Community. The identification information may be identity name information or an identification information string.

For ease of understanding, the following gives a description using examples.

For example, in a specific implementation, the identity information may be: Zhang San—student—student No.— XX School.

Notwithstanding, in a specific implementation, to reduce the length of the value corresponding to the offline graphic code, each part of content in the identity information may be encoded, and a preset code is used to replace the specific information content. For example, for the identification information in the identity information, the set code information is shown in Table 1.

TABLE 1

| Identification information | Code |
| --- | --- |
| Standard enrolled student | 00000000 |
| Standard teacher | 00000001 |
| Minimalist enrolled student | 00000010 |
| Minimalist teacher | 00000011 |
| University customized edition | 00000100 |

Table 1 above sets out codes corresponding to the identification information of students and teachers in a school. Generally, the student identification information may include school name, student name, and grade information. In a specific implementation, a possible format of a code corresponding to the student identity information may be: school name corresponds to 8 bytes, student corresponds to 4 bytes, and grade corresponds to 2 bytes. Each code of student identification information can be generated based on this format. Teacher identity information may generally include a school name, a teacher name, and a professional title. In a specific implementation, a possible format of a code corresponding to teacher identity information may be: school name corresponds to 8 bytes, teacher name corresponds to 4 bytes, and professional title corresponds to 2 bytes. Each code of teacher identification information can be generated based on this format.

In a specific implementation, in setting the identity information of the user, the code may be added as user identification information in a specified position of the identity information subfield. For example, the identification information code may be added in a start position of each identity information subfield.

In a specific implementation, some sensitive information may exist in each piece of identity information corresponding to the user. It is not convenient to disclose such information. Therefore, before the identity information is added to the offline graphic code, the identity information may be encrypted. In this way, the identity information is set in the offline graphic code in the form of identity ciphertext information. In addition, during transmission of the offline graphic code, the identity information is included in the form of an identity information ciphertext, thereby ensuring security of the identity information. Specifically, to reduce the length of the generated value of the offline graphic code, the identity information that needs to be encrypted may be encrypted using a symmetric encryption algorithm.

For example, in a specific implementation, if the user specifies a piece of identity information for encrypting in generating the offline graphic code, the specified identity information is encrypted. In a specific implementation, the identity information of the user may be represented by characters. For example, original data of the identity information of the user is 0000000100001111. After the data is encrypted, ciphertext information 0010111100001100 is obtained. If the identity information of the user is minimalist teacher, the obtained identity information subfield of the user is: 000000110010111100001100.

Notwithstanding, the foregoing is only an exemplary description, and does not constitute a limitation on the embodiments of the specification.

In this way, after the scanning device scans the offline graphic code and parses the offline graphic code to obtain the value corresponding to the offline graphic code, if identity ciphertext information is found in the identity information extracted from the value, the identity ciphertext information is decrypted. Therefore, in the embodiment of the specification, before the extracted identity information is checked/ determined for existence of any identity information accepted by the service provider related to the scanning device, the method provided in the embodiment of the specification further includes:

decrypting the identity ciphertext information that is included in the identity information to obtain decrypted identity information.

In a specific implementation, after a piece of identity information is encrypted, a key identifier used for encryption may be added to the value corresponding to the offline graphic code. After scanning the offline graphic code, the scanning device determines, based on the obtained key identifier, a key for decoding the identity information.

In the embodiment of the specification, an identity information field includes multiple identity information subfields, and one identity information subfield corresponds to one piece of identity information of the user. Therefore, during specific implementation, it is appropriate to encrypt only a specific piece of identity information of the user.

Figure 4:
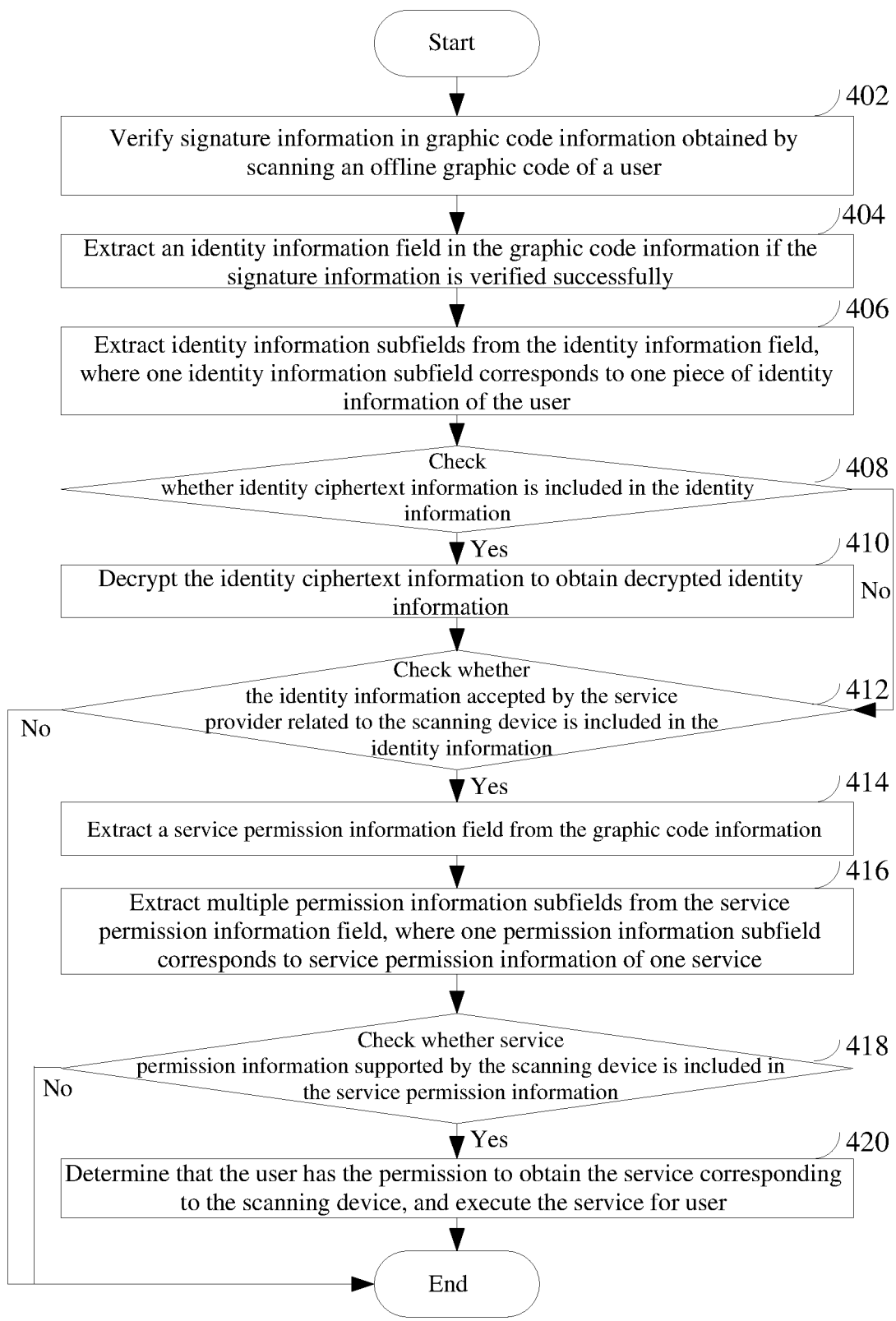
FIG. 4 is a flowchart of another method for processing an offline graphic code, according to an embodiment of the specification.

FIG. 4 is a fourth method flowchart of a method for processing an offline graphic code, according to an embodiment of the specification. The method shown in FIG. 4 includes at least the following steps:

Step 402: Verify signature information in graphic code information obtained by scanning an offline graphic code of a user;

Step 404: Extract an identity information field in the graphic code information if the signature information is verified successfully;

Step 406: Extract an identity information subfield from the identity information field, where one identity information subfield corresponds to one piece of identity information of the user;

Step 408: Detect whether identity ciphertext information is included in the identity information; if the identity ciphertext information is included, perform step 410; otherwise, perform step 412;

Step 410: Decrypt the identity ciphertext information to obtain decrypted identity information;

Step 412: Determine whether identity information accepted by a service provider related to a scanning device is included in the identity information. If such accepted identity information is included, perform step 414; otherwise, end the process;

Step 414: Extract a service permission information field from the graphic code information;

Step 416: Extract multiple permission information subfields from the service permission information field, where one permission information subfield corresponds to service permission information of one service;

Step 418: Determine whether service permission information supported by the scanning device is included in the service permission information. If the supported service permission information is included, perform step 420; otherwise, end the process; and Step 420: Determine that the user has the permission to obtain the service corresponding to the scanning device, and obtain the service.

Figure 5:
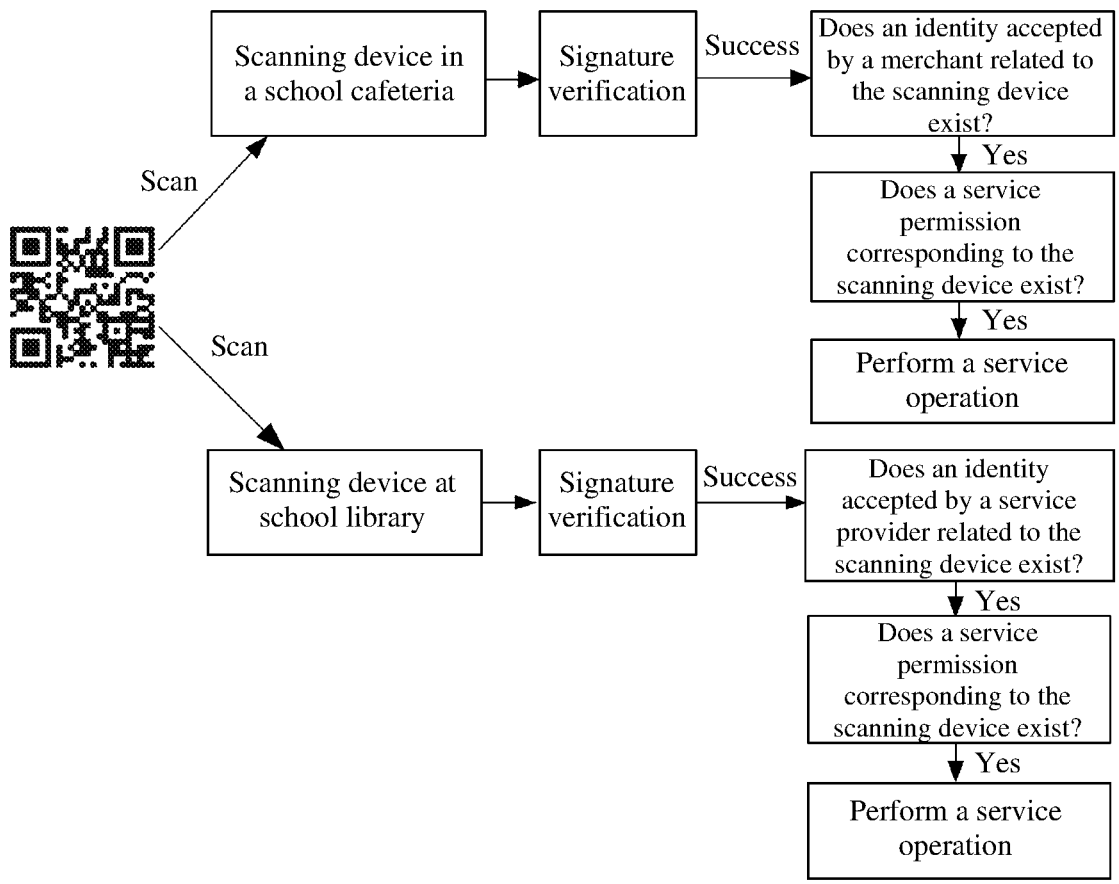
FIG. 5 is a flowchart of a method for processing an offline graphic code, according to an embodiment of the specification.

It should be noted that, in the embodiment of the specification, one piece of identity information of the user and service permission information of multiple services may be set in the offline graphic code. For example, if a user A is a student of XX School, student identity information of the user A may be added to the offline graphic code, and the offline graphic code is assigned a permission to dine in a cafeteria and a permission to enter a library. The method provided in the embodiment of the specification is described below using an example in which the user A dines in a school cafeteria and enters a school library. FIG. 5 is a schematic flowchart of a method for processing an offline graphic code, according to an embodiment of the specification.

In the schematic flowchart shown in FIG. 5, first, when the user A dines in a school cafeteria, the user shows up an offline graphic code using a graphic code display device, and a scanning device installed in the school cafeteria scans the offline graphic code. Based on the graphic code information obtained through scanning, a signature on the offline graphic code is verified. After the signature is verified successfully, the identity information in the offline graphic code is extracted to determine that the user A is a student of XX School and therefore, has an identity accepted by the merchant related to the scanning device. Subsequently, the service permission information in the offline graphic code is extracted, and the extracted service permission information is checked for existence of a service permission supported by the scanning device to pay the XX merchant. If such service permission is included, it is deemed that the user A is permitted to perform a payment operation on the scanning device, and the scanning device performs the corresponding payment operation. When the user A needs to enter a school library, the user shows up the offline graphic code using an offline graphic code display device. A scanning device installed at the entrance of the library scans the offline graphic code. Based on the graphic code information obtained through scanning, a signature on the offline graphic code is verified. After the signature is verified successfully, the identity information is extracted from the offline graphic code to determine that the user A is a student of XX School and therefore, has an identity accepted by the service provider related to the scanning device. Subsequently, the service permission information is extracted from the offline graphic code, and the extracted service permission information is checked for a permission to enter the library. If such permission is included, it is deemed that the user A has a permission to enter the library, and a prompt is given to indicate that the user A is authenticated successfully and access is allowed.

In addition, in the embodiment of the specification, multiple pieces of identity information of the user and service permission information of multiple services may be set in the offline graphic code. For example, if a user A is a student of XX School, student identity information of the user A may be added to the offline graphic code. At the same time, the user A is also an employee of XX Company, and employee identity information of the user A may be added to the offline graphic code. The offline graphic code is assigned a permission to dine in a cafeteria of XX School, a permission to enter a library of XX School, and a permission to enter XX Company. The method provided in the embodiment of the specification is described below using an example in which the user A dines in the cafeteria of XX School and enters XX Company.

First, when the user A dines in a school cafeteria, the user shows up an offline graphic code using a graphic code display device, and a scanning device installed in the school cafeteria scans the offline graphic code. Based on the graphic code information obtained through scanning, a signature on the offline graphic code is verified. After the signature is verified successfully, the identity information in the offline graphic code is extracted to determine that the user A is a student of XX School and therefore, has an identity accepted by the merchant related to the scanning device. Subsequently, the service permission information in the offline graphic code is extracted, and the extracted service permission information is checked for existence of a service permission supported by the scanning device to pay the XX merchant. If such service permission is included, it is deemed that the user A is permitted to perform a payment operation on the scanning device, and the scanning device performs the corresponding payment operation. When the user A needs to enter XX Company, the user shows up the offline graphic code using an offline graphic code display device. A scanning device installed at the entrance of the XX company scans the offline graphic code. Based on the graphic code information obtained through scanning, a signature on the offline graphic code is verified. After the signature is verified successfully, the identity information is extracted from the offline graphic code to determine that the user A is an employee of XX Company and therefore, has an identity accepted by the company related to the scanning device. Subsequently, the service permission information is extracted from the offline graphic code, and the extracted service permission information is checked for a permission to enter the company. If such permission is included, it is deemed that the user A has a permission to enter XX Company, and a prompt is given to indicate that the user A is authenticated successfully and access is allowed.

In the method for processing an offline graphic code according to the embodiment of the specification, at least one piece of identity information of a user and service permission information of multiple services are added to a generated offline graphic code. That is, the user can perform multiple service operations by using the offline graphic code.

In this way, when the user needs to use the offline graphic code in different scenarios, the user only needs to show up the same offline graphic code for verification. A scanning device checks/determines whether identity information accepted by a service provider of the scanning device is included in the offline graphic code, and whether service permission information of a service supported by the scanning device is included in the offline graphic code. Further, based on a check result, the scanning device determines whether the user has a permission to perform a service corresponding to the scanning device. In this way, multiple service permissions are assigned to one offline graphic code, thereby avoiding the trouble of showing up different offline graphic codes to perform different services using the offline graphic code in different scenarios, increasing the utilization ratio of the offline graphic code, and bringing great convenience to the user.

Figure 6:
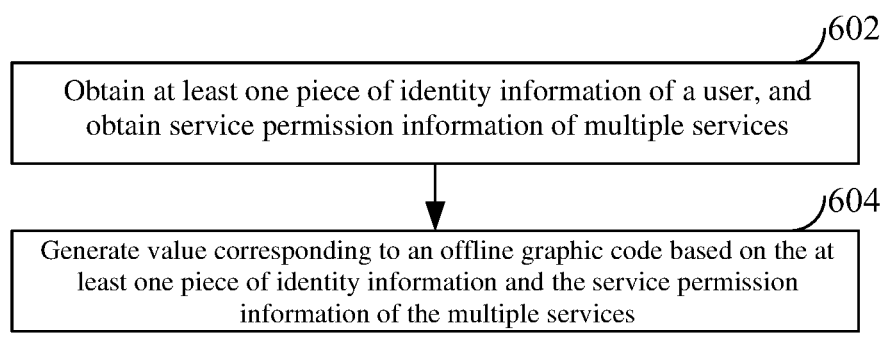
FIG. 6 is a flowchart of a method for generating an offline graphic code, according to an embodiment of the specification.

Corresponding to the method for processing an offline graphic code according to the embodiment of the specification, based on the same idea, an embodiment of the specification further provides a method for generating an offline graphic code. The method is applicable to both a server and a graphic code display device. That is, the method may be performed by a server or a graphic code display device, and specifically, by an apparatus for generating an offline graphic code that is installed on a server or a graphic code display device. FIG. 6 is a first method flowchart of a method for generating an offline graphic code, according to an embodiment of the specification. The method shown in FIG. 6 includes at least the following steps:

Step 602: Obtain at least one piece of identity information of a user, and obtain service permission information of multiple services; and Step 604: Generate a value corresponding to an offline graphic code based on the at least one piece of identity information and the service permission information of the multiple services.

The identity information is identity information accepted by a service provider, and the service is a service supported by a scanning device.

In a specific implementation, if the method is applied to a server, the identity information and the service permission information may be transmitted by the user to the server through a graphic code display device. In a specific implementation, through an offline graphic code generation interface displayed on the graphic code display device, the user may input the identity information and the service permission information that need to be added to the offline graphic code.

After generating a value of the offline graphic code, the server delivers the generated value to the graphic code display device. Specifically, the server may sign the at least one piece of identity information, the service permission information of multiple services, and a generated random number by using an issuer's private key corresponding to the server, to obtain a value corresponding to the offline graphic code.

Specifically, when the value of the offline graphic code is generated on the server, signing needs to be performed only once, without a need to carry the user's public key, thereby reducing the length of the value of the generated offline graphic code.

Notwithstanding, the value corresponding to the offline graphic code may also be generated on the graphic code display device. In a specific implementation, the identity information and the service permission information may be transmitted to the server. The server uses the issuer's private key stored on the server to sign the identity information and the service permission information to obtain corresponding signature information. The server delivers the signature information and the user's public key to the graphic code display device, and the graphic code display device uses the user's private key stored on the graphic code display device to sign a random number, and uses the signature information, random number signature information, and the user's public key as the value corresponding to the offline graphic code.

In a specific implementation, in step 604, the generating a value corresponding to an offline graphic code based on the at least one piece of identity information and the service permission information of the multiple services specifically includes: generating an identity information field based on the identity information, and generating a service permission information field based on the service permission information of the service, where one piece of identity information corresponds to one identity information subfield in the identity information field, and the service permission information of one service corresponds to one service permission information subfield in the service permission field; and generating the value corresponding to the offline graphic code according to the identity information field and the service permission information field.

In a specific implementation, some sensitive information may exist in each piece of identity information corresponding to the user. It is not convenient to disclose such information. Therefore, when the identity information is added to the offline graphic code, the identity information may be encrypted. In this way, the identity information is set in the offline graphic code in the form of identity ciphertext information. In addition, during transmission of the offline graphic code, the identity information is included in the form of an identity information ciphertext, thereby ensuring security of the identity information.

Therefore, in a specific implementation, before step 604, the method provided in the embodiment of the specification further includes: encrypting identity information specified by the user to obtain identity ciphertext information corresponding to the identity information.

Correspondingly, in step 606 above, the generating a value corresponding to an offline graphic code based on the at least one piece of identity information and the service permission information of the multiple services specifically includes: generating the value corresponding to the offline graphic code based on the identity ciphertext information corresponding to the identity information specified by the user, remaining identity information, and the service permission information of the multiple services.

In a specific implementation, the user may specify one or more pieces of identity information that need to be encrypted. In generating the value corresponding to the offline graphic code, the specified identity information is encrypted. The value corresponding to the offline graphic code is generated by using obtained identity ciphertext information, remaining identity information, and a variety of service permission information.

The remaining identity information is identity information other than those that need to be encrypted among all identity information to be added to the offline graphic code.

In the embodiment of the specification, it is appropriate to encrypt only one piece of the identity information among the foregoing identity information.

Specifically, to reduce the length of the generated value of the offline graphic code, the identity information that needs to be encrypted may be encrypted using a symmetric encryption algorithm.

Figure 7:
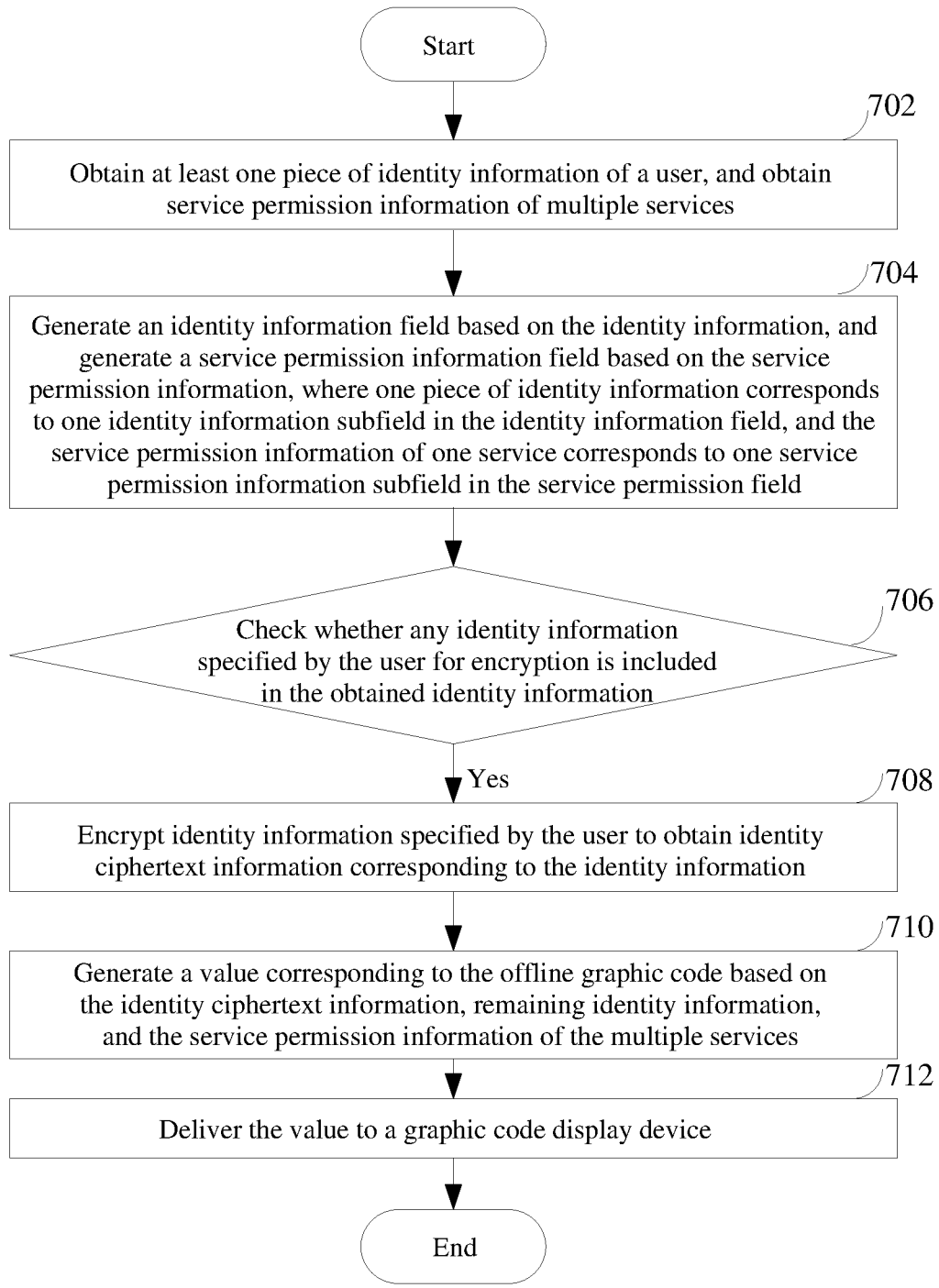
FIG. 7 is a flowchart of another method for generating an offline graphic code, according to an embodiment of the specification.

For ease of understanding, the method for generating an offline graphic code according to the embodiment of the specification is described below using an example in which the value corresponding to the offline graphic code is generated on a server. FIG. 7 is a second method flowchart of a method for generating an offline graphic code, according to an embodiment of the specification. The method shown in FIG. 7 includes at least the following steps:

Step 702: Obtain at least one piece of identity information of a user, and obtain service permission information of multiple services;

Step 704: Generate an identity information field based on the identity information, and generate a service permission information field based on the service permission information, where one piece of identity information corresponds to one identity information subfield in the identity information field, and the service permission information of one service corresponds to one service permission information subfield in the service permission field;

Step 706: Determine whether any identity information specified by the user for encrypting is included in the obtained identity information; if such identity information is included, perform step 708;

Step 708: Encrypt the identity information specified by the user to obtain identity ciphertext information corresponding to the identity information;

Step 710: Generate a value corresponding to the offline graphic code based on the identity ciphertext information, remaining identity information, and the service permission information of the multiple services; and Step 712: Deliver the value to a graphic code display device.

In the method for processing an offline graphic code according to the embodiment of the specification, at least one piece of identity information of a user and service permission information of multiple services are added to a generated offline graphic code. That is, the user can perform multiple service operations using the offline graphic code. In this way, when the user needs to use the offline graphic code in different scenarios, the user only needs to show up the same offline graphic code for verification, thereby assigning multiple service permissions to one offline graphic code, avoiding the trouble of showing up different offline graphic codes to perform different services by using the offline graphic code in different scenarios, increasing the utilization ratio of the offline graphic code, and bringing great convenience to the user.

Figure 8:
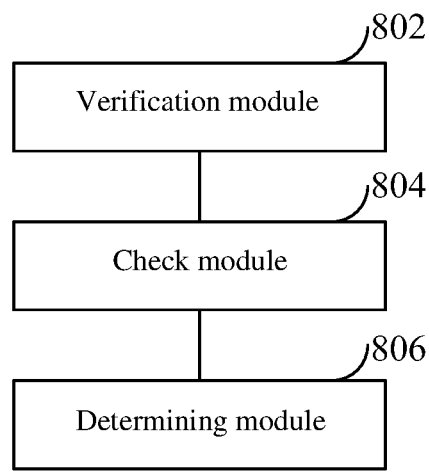
FIG. 8 is a block diagram of an apparatus for processing an offline graphic code, according to an embodiment of the specification.

Corresponding to the methods provided in the embodiments shown in FIG. 1 to FIG. 5 of the specification, based on the same idea, an embodiment of the specification provides an apparatus for processing an offline graphic code, which is applied to a scanning device and is used to perform the methods provided in the embodiments shown in FIG. 1 to FIG. 5 of the specification. FIG. 8 is a schematic composition diagram of modules of an apparatus for processing an offline graphic code, according to an embodiment of the specification. The apparatus shown in FIG. 8 includes: a verification module 802, a check module 804, and a determining module 806.

The verification module 802 is configured to verify signature information in graphic code information obtained by scanning an offline graphic code of a user, where the graphic code information includes the signature information, at least one piece of identity information of the user, and service permission information of multiple services.

The check module 804 is configured to: if the signature information is verified successfully, determine whether identity information accepted by a service provider corresponding to a scanning device is included in the graphic code information, and whether service permission information of a service supported by the scanning device is included in the graphic code information.

The determining module 806 is configured to determine that the user has a permission to obtain the service corresponding to the scanning device if the identity information accepted by the service provider corresponding to the scanning device and the service permission information of the service supported by the scanning device exist.

In some embodiments, the check module 804 includes: a first extraction unit, configured to extract the identity information of the user from the graphic code information; a first check unit, configured to determine whether the identity information accepted by the service provider corresponding to the scanning device is included in the extracted identity information; a second extraction unit, configured to extract the service permission information of the multiple services from the graphic code information; and a second check unit, configured to determine whether the service permission information of the service supported by the scanning device is included in the extracted service permission information of the multiple services.

In some embodiments, the first extraction unit includes: a first extraction subunit, configured to extract an identity information field from the graphic code information; and a second extraction unit, configured to extract an identity information subfield from the identity information field, where one identity information subfield corresponds to one piece of identity information of the user.

In some embodiments, the second extraction unit further includes: a third extraction subunit, configured to extract a service permission information field from the graphic code information; and a fourth extraction subunit, configured to extract multiple permission information subfields from the service permission information field, where one permission information subfield corresponds to service permission information of one service.

In some embodiments, in the embodiment of the specification, the service permission information of the service includes at least one of: the service supported by the scanning device, and service provider information corresponding to the service.

The identity information includes at least one of: a name and identification information of the user, and location information of the user.

In some embodiments, in the embodiment of the specification, encrypted identity ciphertext information is included in the extracted identity information.

Correspondingly, the check module 804 further includes: a decryption unit, configured to decrypt the identity ciphertext information that is included in the identity information to obtain decrypted identity information.

The apparatus for processing an offline graphic code according to the embodiment of the specification can also perform the method performed by the apparatus for processing an offline graphic code shown in FIG. 1 to FIG. 5, and implement the functions of the apparatus for processing an offline graphic code in the embodiments shown in FIG. 1 to FIG. 5, details of which are omitted herein.

With the apparatus for processing an offline graphic code according to the embodiment of the specification, at least one piece of identity information of a user and service permission information of multiple services are added to a generated offline graphic code. That is, the user can perform multiple service operations by using the offline graphic code. In this way, when the user needs to use the offline graphic code in different scenarios, the user only needs to show up the same offline graphic code for verification. A scanning device checks/determines whether identity information accepted by a service provider of the scanning device is included in the offline graphic code, and whether service permission information of a service supported by the scanning device is included in the offline graphic code. Further, based on a check result, the scanning device determines whether the user has a permission to perform a service corresponding to the scanning device. In this way, multiple service permissions are assigned to one offline graphic code, thereby avoiding the trouble of showing up different offline graphic codes to perform different services using the offline graphic code in different scenarios, increasing the utilization ratio of the offline graphic code, and bringing great convenience to the user.

Figure 9:
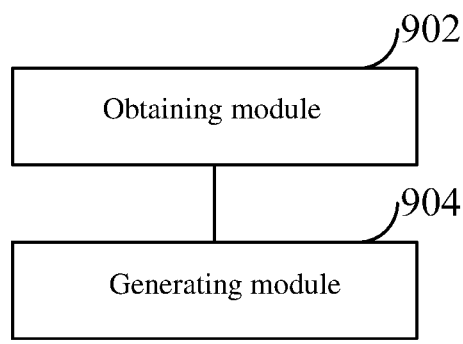
FIG. 9 is a block diagram of an apparatus for generating an offline graphic code, according to an embodiment of the specification.

Corresponding to the methods provided in the embodiments shown in FIG. 6 to FIG. 7 of the specification, based on the same idea, an embodiment of the specification provides an apparatus for generating an offline graphic code, which is applied to both a server and a graphic code display device and is used to perform the methods provided in the embodiments shown in FIG. 6 to FIG. 7 of the specification. FIG. 9 is a schematic composition diagram of modules of an apparatus for generating an offline graphic code, according to an embodiment of the specification. The apparatus shown in FIG. 9 includes:

an obtaining module 902, configured to obtain at least one piece of identity information of a user, and obtain service permission information of multiple services; and a generating module 904, configured to generate a value corresponding to an offline graphic code based on the at least one piece of identity information and the service permission information of the multiple services.

In some embodiments, the generating module 904 includes:

a first generating unit, configured to generate an identity information field based on the identity information, and generate a service permission information field based on the service permission information of the service, where one piece of identity information corresponds to one identity information subfield in the identity information field, and the service permission information of one service corresponds to one service permission information subfield in the service permission field; and a second generating unit, configured to generate the value corresponding to the offline graphic code according to the identity information field and the service permission information field.

In some embodiments, the apparatus provided in the embodiment of the specification further includes:

an encryption module, configured to encrypt identity information specified by the user to obtain identity ciphertext information corresponding to the identity information.

Correspondingly, the generating module 904 includes:

a third generating unit, configured to generate the value corresponding to the offline graphic code based on the identity ciphertext information corresponding to the identity information specified by the user, remaining identity information, and the service permission information of the multiple services.

The apparatus for generating an offline graphic code according to the embodiment of the specification can also perform the method performed by the apparatus for generating an offline graphic code shown in FIG. 6 to FIG. 7, and implement the functions of the apparatus for generating an offline graphic code in the embodiments shown in FIG. 6 to FIG. 7, details of which are omitted herein.

With the apparatus for generating an offline graphic code according to the embodiment of the specification, at least one piece of identity information of a user and service permission information of multiple services are added to a generated offline graphic code. That is, the user can perform multiple service operations using the offline graphic code. In this way, when the user needs to use the offline graphic code in different scenarios, the user only needs to show up the same offline graphic code for verification, thereby assigning multiple service permissions to one offline graphic code, avoiding the trouble of showing up different offline graphic codes to perform different services by using the offline graphic code in different scenarios, increasing the utilization ratio of the offline graphic code, and bringing great convenience to the user.

Figure 10:
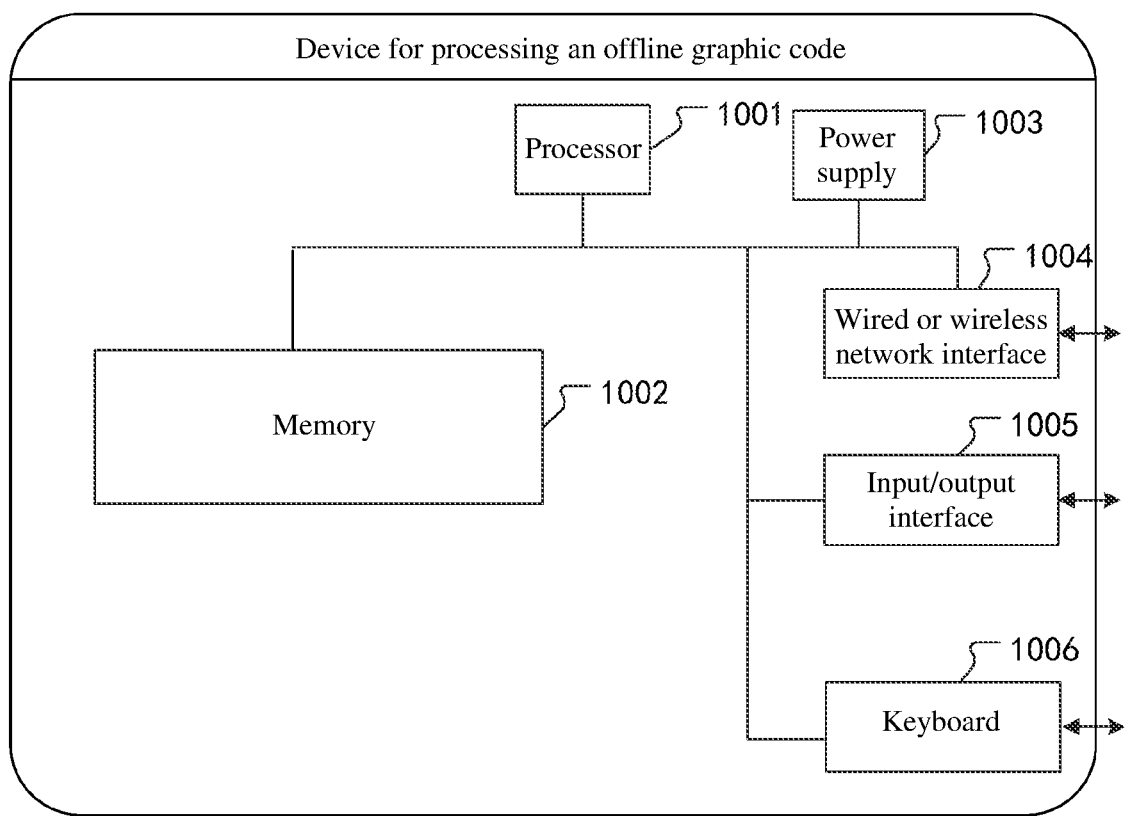
FIG. 10 is a block diagram of a device for processing and/or generating an offline graphic code, according to an embodiment of the specification.

Further, based on the methods shown in FIG. 1 to FIG. 5, an embodiment of the specification further provides a device for processing an offline graphic code, which is applied to a scanning device, as shown in FIG. 10.

The device for processing an offline graphic code may vary sharply depending on configuration or performance, and may include one or more processors 1001 and a memory 1002. The memory 1002 may store one or more applications or data. The memory 1002 may be a volatile memory or a permanent memory. The application stored in the memory 1002 may include one or more modules (not shown in the drawings), and each module may include a series of computer-executable instruction information in the device for processing an offline graphic code. Furthermore, the processor 1001 may be configured to communicate with the memory 1002, and execute a series of computer-executable instruction information in the memory 1002 on the device for processing an offline graphic code. The device for processing an offline graphic code may further include one or more power sources 1003, one or more wired or wireless network interfaces 1004, one or more input/output interfaces 1005, one or more keyboards 1006, and the like.

In a specific embodiment, the device for processing an offline graphic code includes a memory and one or more programs. The one or more programs are stored in the memory, and the one or more programs may include one or more modules. Each module may include a series of computer-executable instruction information in the device for processing an offline graphic code. The one or more processors are configured to execute the one or more programs including the following computer-executable instruction information:

verifying signature information in graphic code information obtained by scanning an offline graphic code of a user, where the graphic code information includes the signature information, at least one piece of identity information of the user, and service permission information of multiple services;

determining, if the signature information is verified successfully, whether identity information accepted by a service provider corresponding to a scanning device is included in the graphic code information, and whether service permission information of a service supported by the scanning device is included in the graphic code information; and determining that the user has a permission to obtain the service corresponding to the scanning device if the identity information accepted by the service provider corresponding to the scanning device and the service permission information of the service supported by the scanning device exist.

In some embodiments, when the computer-executable instruction information is executed, the determining whether identity information accepted by a service provider corresponding to a scanning device is included in the graphic code information includes:

extracting the identity information of the user from the graphic code information; and determining whether the identity information accepted by the service provider corresponding to the scanning device is included in the extracted identity information.

The determining whether service permission information of a service supported by the scanning device is included in the graphic code information includes:

extracting the service permission information of the multiple services from the graphic code information; and determining whether the service permission information of the service supported by the scanning device is included in the extracted service permission information of the multiple services.

In some embodiments, when the computer-executable instruction information is executed, the extracting the identity information of the user from the graphic code information includes:

extracting an identity information field from the graphic code information; and extracting an identity information subfield from the identity information field, where one identity information subfield corresponds to one piece of identity information of the user.

In some embodiments, when the computer-executable instruction information is executed, the extracting the service permission information of the multiple services from the graphic code information includes:

extracting a service permission information field from the graphic code information; and extracting multiple permission information subfields from the service permission information field, where one permission information subfield corresponds to service permission information of one service.

In some embodiments, when the computer-executable instruction information is executed, encrypted identity ciphertext information is included in the extracted identity information.

Before the determining whether the identity information accepted by the service provider corresponding to the scanning device is included in the extracted identity information, the method further includes: decrypting the identity ciphertext information that is included in the identity information to obtain decrypted identity information.

In some embodiments, when the computer-executable instruction information is executed, the service permission information of the service includes at least: the service supported by the scanning device, and service provider information corresponding to the service.

The identity information includes at least: a name and identification information of the user, and application scenario (service) location information.

With the device for processing an offline graphic code according to the embodiment of the specification, at least one piece of identity information of a user and service permission information of multiple services are added to a generated offline graphic code. That is, the user can perform multiple service operations by using the offline graphic code. In this way, when the user needs to use the offline graphic code in different scenarios, the user only needs to show up the same offline graphic code for verification. A scanning device checks/determines whether identity information accepted by a service provider of the scanning device is included in the offline graphic code, and whether service permission information of a service supported by the scanning device is included in the offline graphic code. Further, based on a check result, the scanning device determines whether the user has a permission to perform a service corresponding to the scanning device. In this way, multiple service permissions are assigned to one offline graphic code, thereby avoiding the trouble of showing up different offline graphic codes to perform different services using the offline graphic code in different scenarios, increasing the utilization ratio of the offline graphic code, and bringing great convenience to the user.

Further, based on the methods shown in FIG. 6 to FIG. 7, an embodiment of the specification further provides a device for generating an offline graphic code. For a specific structure of the device, reference may be made to the device for processing an offline graphic code shown in FIG. 10.

In a specific embodiment, the device for generating an offline graphic code includes a memory and one or more programs. The one or more programs are stored in the memory, and the one or more programs may include one or more modules. Each module may include a series of computer-executable instruction information in the device for generating an offline graphic code. The one or more processors are configured to execute the one or more programs including the following computer-executable instruction information: obtaining at least one piece of identity information of a user, and obtaining service permission information of multiple services; and generating a value corresponding to an offline graphic code based on the at least one piece of identity information and the service permission information of the multiple services.

In some embodiments, when the computer-executable instruction information is executed, the generating a value corresponding to an offline graphic code based on the at least one piece of identity information and the service permission information of the multiple services includes: generating an identity information field based on the identity information, and generating a service permission information field based on the service permission information of the service, where one piece of identity information corresponds to one identity information subfield in the identity information field, and the service permission information of one service corresponds to one service permission information subfield; and generating the value corresponding to the offline graphic code according to the identity information field and the service permission information field.

In some embodiments, when the computer-executable instruction information is executed, before the to-be-generated value corresponding to an offline graphic code is generated based on the at least one piece of identity information and the service permission information of the multiple services, the following steps may be further performed: encrypting identity information specified by the user to obtain identity ciphertext information corresponding to the identity information.

Correspondingly, the generating a value corresponding to an offline graphic code based on the at least one piece of identity information and the service permission information of the multiple services includes: generating the value corresponding to the offline graphic code based on the identity ciphertext information corresponding to the identity information specified by the user, remaining identity information, and the service permission information of the multiple services.

With the device for generating an offline graphic code according to the embodiment of the specification, at least one piece of identity information of a user and service permission information of multiple services are added to a generated offline graphic code. That is, the user can perform multiple service operations using the offline graphic code. In this way, when the user needs to use the offline graphic code in different scenarios, the user only needs to show up the same offline graphic code for verification, thereby assigning multiple service permissions to one offline graphic code, avoiding the trouble of showing up different offline graphic codes to perform different services by using the offline graphic code in different scenarios, increasing the utilization ratio of the offline graphic code, and bringing great convenience to the user.

Further, based on the methods shown in FIG. 1 to FIG. 5, an embodiment of the specification further provides a storage medium, configured to store computer-executable instruction information. In a specific embodiment, the storage medium may be a USB disk, an optical disk, a hard disk, or the like. When executed by a processor, the computer-executable instruction information stored in the storage medium can implement the following process: verifying signature information in graphic code information obtained by scanning an offline graphic code of a user, where the graphic code information includes the signature information, at least one piece of identity information of the user, and service permission information of multiple services; determining, if the signature information is verified successfully, whether identity information accepted by a service provider corresponding to a scanning device is included in the graphic code information, and whether service permission information of a service supported by the scanning device is included in the graphic code information; and determining that the user has a permission to obtain the service corresponding to the scanning device if the identity information accepted by the service provider corresponding to the scanning device and the service permission information of the service supported by the scanning device exist.

In some embodiments, when the computer-executable instruction information stored in the storage medium is executed by a processor, the determining whether identity information accepted by a service provider corresponding to a scanning device is included in the graphic code information includes: extracting the identity information of the user from the graphic code information; and determining whether the identity information accepted by the service provider corresponding to the scanning device is included in the extracted identity information.

The determining whether service permission information of a service supported by the scanning device is included in the graphic code information includes: extracting the service permission information of the multiple services from the graphic code information; and determining whether the service permission information of the service supported by the scanning device is included in the extracted service permission information of the multiple services.

In some embodiments, when the computer-executable instruction information stored in the storage medium is executed by a processor, the extracting the identity information of the user from the graphic code information includes: extracting an identity information field from the graphic code information; and extracting an identity information subfield from the identity information field, where one identity information subfield corresponds to one piece of identity information of the user.

In some embodiments, when the computer-executable instruction information stored in the storage medium is executed by a processor, the extracting the service permission information of the multiple services from the graphic code information includes: extracting a service permission information field from the graphic code information; and extracting multiple permission information subfields from the service permission information field, where one permission information subfield corresponds to service permission information of one service.

In some embodiments, when the computer-executable instruction information stored in the storage medium is executed by a processor, encrypted identity ciphertext information is included in the extracted identity information.

Before the determining whether the identity information accepted by the service provider corresponding to the scanning device is included in the extracted identity information, the method further includes: decrypting the identity ciphertext information that is included in the identity information to obtain decrypted identity information.

In some embodiments, when the computer-executable instruction information stored in the storage medium is executed by a processor, the service permission information of the service includes at least: the service supported by the scanning device, and service provider information corresponding to the service.

The identity information includes at least: a name and identification information of the user, and application scenario region information.

When the computer-executable instruction information stored in the storage medium provided in the embodiment of the specification is executed by a processor, one piece of identity information of a user and service permission information of multiple services are added to a generated offline graphic code. That is, the user can perform multiple service operations by using the offline graphic code. In this way, when the user needs to use the offline graphic code in different scenarios, the user only needs to show up the same offline graphic code for verification. A scanning device checks/determines whether identity information accepted by a service provider of the scanning device is included in the offline graphic code, and whether service permission information of a service supported by the scanning device is included in the offline graphic code. Further, based on a check result, the scanning device determines whether the user has a permission to perform a service corresponding to the scanning device. In this way, multiple service permissions are assigned to one offline graphic code, thereby avoiding the trouble of showing up different offline graphic codes to perform different services using the offline graphic code in different scenarios, increasing the utilization ratio of the offline graphic code, and bringing great convenience to the user.

Further, based on the methods shown in FIG. 6 to FIG. 7, an embodiment of the specification further provides a storage medium, configured to store computer-executable instruction information. In a specific embodiment, the storage medium may be a USB disk, an optical disk, a hard disk, or the like. When executed by a processor, the computer-executable instruction information stored in the storage medium can implement the following process: obtaining at least one piece of identity information of a user, and obtaining service permission information of multiple services; and generating a value corresponding to an offline graphic code based on the at least one piece of identity information and the service permission information of the multiple services.

In some embodiments, when the computer-executable instruction information stored in the storage medium is executed by a processor, the generating a value corresponding to an offline graphic code based on the at least one piece of identity information and the service permission information of the multiple services includes: generating an identity information field based on the identity information, and generating a service permission information field based on the service permission information of the service, where one piece of identity information corresponds to one identity information subfield in the identity information field, and the service permission information of one service corresponds to one service permission information subfield; and generating the value corresponding to the offline graphic code according to the identity information field and the service permission information field.

In some embodiments, when the computer-executable instruction information stored in the storage medium is executed by a processor, before the generating a value corresponding to an offline graphic code based on the at least one piece of identity information and the service permission information of the multiple services, the following step may be further performed: encrypting identity information specified by the user to obtain identity ciphertext information corresponding to the identity information.

Correspondingly, the generating a value corresponding to an offline graphic code based on the at least one piece of identity information and the service permission information of the multiple services includes: generating the value corresponding to the offline graphic code based on the identity ciphertext information corresponding to the identity information specified by the user, remaining identity information, and the service permission information of the multiple services.

When the computer-executable instruction information stored in the storage medium provided in the embodiment of the specification is executed by a processor, at least one piece of identity information of a user and service permission information of multiple services are added to a generated offline graphic code. That is, the user can perform multiple service operations using the offline graphic code. In this way, when the user needs to use the offline graphic code in different scenarios, the user only needs to show up the same offline graphic code for verification, thereby assigning multiple service permissions to one offline graphic code, avoiding the trouble of showing up different offline graphic codes to perform different services by using the offline graphic code in different scenarios, increasing the utilization ratio of the offline graphic code, and bringing great convenience to the user.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced boolean expression language (ABEL), altera hardware description language (AHDL), Confluence, cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, in implementation of the specification, the function of the units may be implemented in a same piece of or multiple pieces of software and/or hardware.

A person skilled in the art should understand that the embodiments of the specification may be provided as a method, a system, or a computer program product. Therefore, the specification may use a form of a hardware-only embodiment, a software-only embodiment, or an embodiment combining software and hardware. In addition, the specification may use a form of a computer program product implemented on one or more computer available storage media (including but not limited to a disk memory, a CD-ROM, an optical memory, and the like) including computer available program code.

The specification is described with reference to flowcharts and/or block diagrams of the method, the device (system), and the computer program product in the embodiments of the specification. It should be understood that computer program instruction information can implement each procedure and/or block in the flowcharts and/or block diagrams and a combination of procedures and/or blocks in the flowcharts and/or block diagrams. The computer program instruction information may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instruction information executed by the general-purpose computer or the processor of another programmable data processing device.

The computer program instruction information may also be stored in a computer readable memory that can instruct the computer or any other programmable data processing device to work in a specific manner, so that the instruction information stored in the computer readable memory generate an artifact that includes an instruction information apparatus. The instruction information apparatus implements a specific function in one or more processes in the flowcharts and/or in one or more blocks in the block diagrams.

The computer program instruction information may also be loaded into a computer or another programmable data processing device, so that a series of operation steps are performed on the computer or another programmable data processing device to generate processing implemented by a computer, and instruction information executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include, among computer readable media, a non-persistent memory such as a random access memory (RAM) and/or a non-volatile memory such as a read-only memory (ROM) or a flash memory (flash RAM). The memory is an example of the computer readable medium.

The computer readable medium includes a persistent medium and a non-persistent medium, a removable medium and a non-removable medium, which may implement storage of information by using any method or technology. The information may be a computer readable instruction information, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition herein, the computer-readable medium does not include transitory computer readable media (transitory media), such as a modulated data signal and a carrier.

It should also be noted that the terms "include", "comprise" and any other variants mean to cover the non-exclusive inclusion. Therefore, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

A person skilled in the art should understand that the embodiments of the specification may be provided as a method, a system, or a computer program product. Therefore, the specification may use a form of hardware only embodiments, software only embodiments, or embodiments with a combination of software and hardware. In addition, the specification may use a form of a computer program product implemented on one or more computer available storage media (including but not limited to a disk memory, a CD-ROM, an optical memory, and the like) including computer available program code.

The specification can be described in the general context of computer executable instruction information executed by a computer, for example, a program module. Generally, the program module includes a routine, a program, an object, a component, a data structure, and the like for executing a particular task or implementing a particular abstract data type. The specification can also be practiced in a distributed computing environment in which tasks are performed by remote processing devices that are connected through a communication network. In a distributed computing environment, the program module may be located in both local and remote computer storage media including storage devices.

The embodiments in this specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The foregoing descriptions are merely embodiments of the specification and are not intended to limit the specification. For a person skilled in the art, various modifications and variations can be made to the specification. Any modification, equivalent replacement, or improvement made without departing from the spirit and principle of the specification shall fall within the scope of the claims of the specification.

What is claimed is:

1. An apparatus comprising:
   one or more processors; and a memory storing instructions executable by the one or more processors to cause the one or more processors to perform operations comprising:

scanning, via a scanning device, a graphic code displayed on a user terminal of a user to obtain an image of the graphic code;

extracting from the image of the graphic code, by a processor coupled to the scanning device, graphic code information encoded in the graphic code;

extracting, by the processor, an identity information field in the graphic code information corresponding to identity information of the user;

determining, by the processor, whether the identity information of the user is accepted by a service provider corresponding to the scanning device;

in response to the identity information of the user being accepted by the service provider corresponding to the scanning device, extracting from the graphic code information, by the processor, service permission information of one or more services corresponding to the graphic code;

determining, by the processor, whether service permission information of a first service supported by the scanning device is included in the extracted service permission information of the one or more services; and in response to the service permission information being included in the extracted service permission information of the one or more services, determining, by the processor, that the user has the permission to obtain the first service supported by the scanning device.

2. The apparatus of claim 1, wherein the operations further comprise:
extracting, by the processor, an identity information subfield from the identity information field, wherein the identity information subfield corresponds to the identity information of the user.

3. The apparatus of claim 1, wherein the operations further comprise:
verifying, by the processor, signature information in the graphic code information; and
extracting, by the processor, the identity information field in the graphic code information in response to the signature information being successfully verified.

4. The apparatus of claim 1, wherein the operations further comprise:
in response to determining that the user has the permission to obtain the first service supported by the scanning device, executing, by the processor, the first service.

5. The apparatus of claim 1, wherein the extracting, by the processor, the service permission information of one or more services corresponding to the graphic code from the graphic code information comprises:
extracting, by the processor, a service permission information field from the graphic code information; and
extracting, by the processor, a plurality of permission information subfields from the service permission information field, wherein one of the permission information subfields corresponds to the service permission information of the first service.

6. The apparatus of claim 5, wherein:
the service permission information of the first service comprises: the first service supported by the scanning device, or service provider information corresponding to the first service supported by the scanning device; and the identity information of the user comprises: identification information of the user, or location information for the first service supported by the scanning device.

7. The apparatus of claim 1, wherein the first service supported by the scanning device includes: opening a gate for the user or performing a payment for the user.

8. One or more non-transitory computer-readable storage media configured with instructions executable by one or more processors to cause the one or more processors to perform operations comprising:

scanning, via a scanning device, a graphic code displayed on a user terminal of a user to obtain an image of the graphic code;

extracting from the image of the graphic code, by a processor coupled to the scanning device, graphic code information encoded in the graphic code;

extracting, by the processor, an identity information field in the graphic code information corresponding to identity information of the user;

determining, by the processor, whether the identity information of the user is accepted by a service provider corresponding to the scanning device;

in response to the identity information of the user being accepted by the service provider corresponding to the scanning device, extracting from the graphic code information, by the processor, service permission information of one or more services corresponding to the graphic code;

determining, by the processor, whether service permission information of a first service supported by the scanning device is included in the extracted service permission information of the one or more services; and in response to the service permission information being included in the extracted service permission information of the one or more services, determining, by the processor, that the user has the permission to obtain the first service supported by the scanning device.

9. The one or more non-transitory computer-readable storage media of claim 8, wherein the operations further comprise:
extracting, by the processor, an identity information subfield from the identity information field, wherein the identity information subfield corresponds to the identity information of the user.

10. The one or more non-transitory computer-readable storage media of claim 8, wherein the operations further comprise:
verifying, by the processor, signature information in the graphic code information; and
extracting, by the processor, the identity information field in the graphic code information in response to the signature information being successfully verified.

11. The one or more non-transitory computer-readable storage media of claim 8, wherein the operations further comprise:
in response to determining that the user has the permission to obtain the first service supported by the scanning device, executing, by the processor, the first service.

12. The one or more non-transitory computer-readable storage media of claim 8, wherein the extracting, by the processor, the service permission information of one or more services corresponding to the graphic code from the graphic code information comprises:
extracting, by the processor, a service permission information field from the graphic code information; and extracting, by the processor, a plurality of permission information subfields from the service permission information field, wherein one of the permission information subfields corresponds to the service permission information of the first service.

13. The one or more non-transitory computer-readable storage media of claim 12, wherein:
the service permission information of the first service comprises: the first service supported by the scanning device, or service provider information corresponding to the first service supported by the scanning device; and
the identity information of the user comprises: identification information of the user, or location information for the first service supported by the scanning device.

14. The one or more non-transitory computer-readable storage media of claim 8, wherein the first service supported by the scanning device includes: opening a gate for the user or performing a payment for the user.

15. A method, comprising:
scanning, by a scanning device, a graphic code displayed on a user terminal of a user to obtain an image of the graphic code;
extracting from the image of the graphic code, by a processor coupled to the scanning device, graphic code information encoded in the graphic code;
extracting, by the processor, an identity information field in the graphic code information corresponding to identity information of the user;
determining, by the processor, whether the identity information of the user is accepted by a service provider corresponding to the scanning device;
in response to the identity information of the user being accepted by the service provider corresponding to the scanning device, extracting from the graphic code information, by the processor, service permission information of one or more services corresponding to the graphic code;
determining, by the processor, whether service permission information of a first service supported by the scanning device is included in the extracted service permission information of the one or more services; and
in response to the service permission information being included in the extracted service permission information of the one or more services, determining, by the processor, that the user has the permission to obtain the first service supported by the scanning device.

16. The method of claim 15, further comprising:
extracting, by the processor, an identity information subfield from the identity information field, where the identity information subfield corresponds to the identity information of the user.

17. The method of claim 15, further comprising:
verifying, by the processor, signature information in the graphic code information; and
extracting, by the processor, the identity information field in the graphic code information in response to the signature information being successfully verified.

18. The method of claim 15, further comprising:
in response to determining that the user has the permission to obtain the first service supported by the scanning device, executing, by the processor, the first service.

19. The method of claim 15, wherein the extracting, by the processor, the service permission information of one or more services corresponding to the graphic code from the graphic code information comprises:
extracting, by the processor, a service permission information field from the graphic code information; and
extracting, by the processor, a plurality of permission information subfields from the service permission information field, wherein one of the permission information subfields corresponds to the service permission information of the first service.

20. The method of claim 19, wherein:
the service permission information of the first service comprises: the first service supported by the scanning device, or service provider information corresponding to the first service supported by the scanning device; and
the identity information of the user comprises: identification information of the user, or location information for the first service supported by the scanning device.

* * * * *